United States Patent [19]

Shibata et al.

[11] Patent Number: 4,812,339
[45] Date of Patent: Mar. 14, 1989

[54] ARTIFICIAL SOIL AND CONSTRUCTION OF BED SOIL FOR PUTTING GREEN USING ARTIFICIAL SOIL

[75] Inventors: Masashi Shibata, Kume; Iwao Hayakawa, Akaiwa; Tokimasa Hayashibara, Kume, all of Japan

[73] Assignee: Nisshoku Corporation, Okayama, Japan

[21] Appl. No.: 69,529

[22] Filed: Jul. 1, 1987

[30] Foreign Application Priority Data

Oct. 21, 1986 [JP] Japan .................. 61-251542

[51] Int. Cl.$^4$ .......................... A01N 1/00; A41G 3/00
[52] U.S. Cl. ........................ 428/15; 405/264; 405/266; 210/730; 210/734; 71/24; 71/25; 428/332
[58] Field of Search ............ 428/15, 332; 405/264, 405/266; 210/730, 734; 71/24, 25

[56] References Cited

U.S. PATENT DOCUMENTS 3,985,536 10/1976 Abbe et al. ................ 210/730
4,594,281 6/1986 Haraga et al. ................ 428/172

FOREIGN PATENT DOCUMENTS 147587 2/1981 Japan .
192017 2/1986 Japan .

Primary Examiner—Ellis P. Robinson
Assistant Examiner—P. J. Ryan
Attorney, Agent, or Firm—Wenderoth, Lind & Ponack

[57] ABSTRACT

According to the present invention, an artificial soil, which has compound effects, and is used in a wide range, and is easy to handle, is obtained by mixing Shirasu, fine particles of fossils, pulverized organic materials and soil-aggregating agent powders, and a construction of a bed soil for a putting green having excellent drainage and water-holding property and fertilizer-holding property is obtained by forming the bed soil of an upper growth layer formed of the artificial soil formed of a mixture comprising Shirasu, fine particles of fossils, pulverized organic materials and soil-aggregating agent powders, sands and soils and a lower drainage-layer formed of sands or mainly comprising sands.

2 Claims, 1 Drawing Sheet

U.S. Patent
Mar. 14, 1989
4,812,339
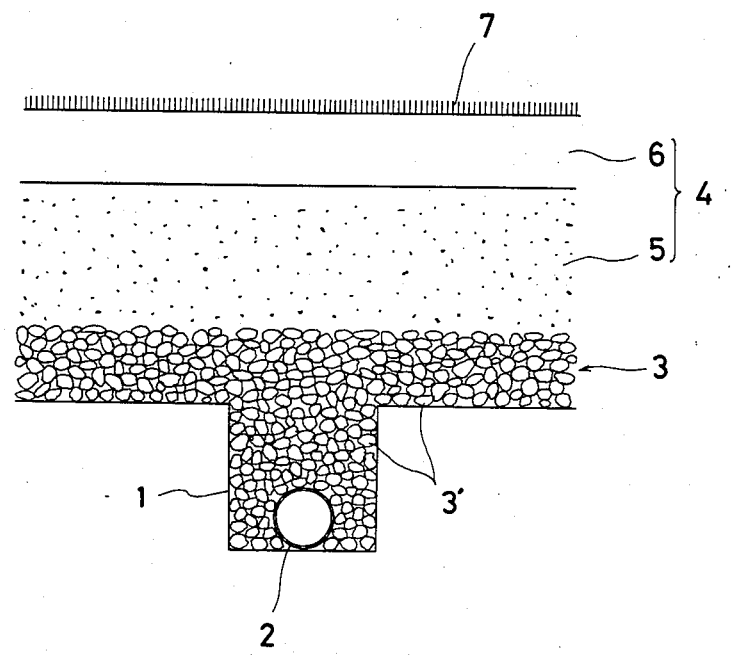

ARTIFICIAL SOIL AND CONSTRUCTION OF BED SOIL FOR PUTTING GREEN USING ARTIFICIAL SOIL

BACKGROUND OF THE INVENTION

1. Field of the Invention

The present invention relates to an artificial soil, which can be usefully used for a bed soil of a putting green in golf links, an agriculture and a cultivation, and a construction of a bed soil of a putting green using the same.

2. Description of the Prior Art

Although various kinds of artifical soil have been developed, the conventional artificial soils have exhibited a simple effect but no compound effects, whereby the scope of using artificial soils has been limited.

In addition, although various kinds of material for soil amendment have been proposed, they are in general powdery, so that, in the event that the materials for soil amendment are mixed with soils, a disadvantage occurs in that they are one-sided, whereby they can not be uniformly mixed.

Besides, although organic fertilizers have arrived on the market in great quantities, since they generally have a lower pH and are under an overmoistened condition, it has been pointed out that the growth of plants is not good and an action of effective bacteria is insufficient. Moreover, they have been difficult to handle.

On the other hand, although the construction and improvement of a putting green have been carried out in golf links, no putting green having a construction of a bed soil having the fertilizer-holding property and the drainage-property at the same time has been realized.

In general, it has been pointed out that a putting green in golf links, in which great importance is attached to the fertilizer-holding property, shows the solidification of clayey fractions by a stepping pressure or a flowing-down water in the course of years even though it is superior in drainage-property at the beginning, whereby generating a bad drainage, a root rot of a lawn and diseases.

Thus, a sand green, in which great importance is attached to the drainage-property, has been recently designed in great quantities. However, since this sand green is too sandy to give sufficient water-holding property and fertilizer-holding property and prevent a lawn from dying, it is necessary to carry out the irrigation and the fertilization all the year round, which is remarkably expensive.

SUMMARY OF THE INVENTION

The present invention was achieved paying attention to the above described matters.

Thus, it is an object of the present invention to provide an artificial soil, which has compound effects, being used in a wide scope, and being easy to handle, and a construction of a bed soil for a putting green having a superior drainage-property, a water-holding property and a fertilizer-holding property at the same time.

In order to achieve the above described object, an artificial soil according to the present invention is characterized by that Shirasu, fine particles of fossils, pulverized organic materials and soil-aggregating agent powders are blended.

An artificial soil having the above described characteristical construction contains water at a lower ratio and is granular, whereby being easy to handle and having the water-holding property, the soil-amending property and the fertilizing effect at the same time, that is to say, not a simple effect but compound effects. Moreover, it exhibits a superior advantage in that it can be uniformly and easily mixed with general soils.

Besides, according to the construction of the bed soil for a putting green of the present invention, the bed soil is formed of an upper growth layer formed of a mixture comprising an artificial soil, which is formed of a mixture comprising Shirasu, fine particles of fossils, pulverized organic materials and soil-aggregating agent powders, sands and soils and a lower drainage layer formed of sands or mainly comprising sands, so that in the event that a lawn is seeded or stuck onto said bed soil, since the upper growth-layer has the water-holding property and the fertilizer-holding property, the lawn is energetically grown and it is unnecessary to always carry out the irrigation and the fertilization differently from the case of the sand green and this construction is economical. And, the clayey fractions are not solidified in spite of the action of the stepping pressure and the flowing-down water, whereby maintaining a superior drainage-property and preventing the root rot and diseases of the lawn from generating.

Thus, an ideal construction of a bed soil for a putting green having the water-holding property, the fertilizer-holding property and the remarkably excellent drainage-property at the same time can be obtained by dividing the bed soil into the upper growth layer and the lower drainage layer.

An artificial soil according to the present invention can be used also as an artificial soil for fields, a gardening, various kinds of agriculture and various kinds of cultivation.

DESCRIPTION OF THE DRAWING

The drawing is a sectional view showing one example of a construction of a bed soil for a putting green using an artificial soil according to the present invention.

DESCRIPTION OF THE PREFERRED EMBODIMENT

The preferred embodiment of the present invention will be below described.

An artificial soil according to the present invention is formed of Shirasu having a rough surface and a diameter of 1.0 to 2.5 mm and containing water at a ratio of 30 to 40%, fine particles of fossils, such coral fossils and shelfish fossils, having a rough surface and a diameter of 2. 5 mm or less and containing water at a ratio of 10%, organic materials such as a peat containing a leaf mold, which contains water at a ratio of 25 to 30%, at a ratio of 60 to 70%, rotted bark composts and pulverized peat mosses, and soil-amending agents such as polyethylene oxide powders and polyacrylamide powders. Heated and then pulverized vermiculite may be blended as the material for soil amendment.

A typical composition of an artificial soil according to the present invention is shown in Table 1.

TABLE 1

| Material | Blending quantity (m³) |
| --- | --- |
| Shirasu | 2.5 |
| Peat | 2.25 |
| Shellfish fossil | 0.25 |
| Coral fossil | 0.25 |
| Mixture of polyethylene | 0.1 |

TABLE 1-continued

| Material | Blending quantity (m³) |
|---|---|
| oxide and vermiculite | |

The above described materials are put in a cylindrical drum having a diameter of 1.5 m and a length of 3 m and then stirred by means of a suitable stirring member to obtain a black granular artificial soil having a diameter of about 3 to 5 mm and containing water at a ratio of 20 to 30% by a water contained in peats, Shirasu, fossils of sheels and coral fossils and the viscous effect of polyethylene oxide.

In this case, triiron tetroxide powders may be blended as a micro element for increasing a black color and reinforcing a stalk of a leaf and the like.

Nextly, a construction of a bed soil for a putting green constructed using the artificial soil having the above described construction will be described with reference to the drawing. Reference numeral 1 designates a drain of a cuvert formed in a foundation of the spot in a rib-like shape as seen on a plan, said drain 1 having a depth and a width both of for example 30 cm, and a drain pipe 2 provided with a suitable number of small holes formed on a circumference thereof being laid in the drain 1. Reference numeral 3 designates a gravel-layer formed by spreading gravels 3' having a diameter of about 10 cm around and over said drain pipe 2 in great numbers so that an upper surface thereof may be at a distance of about 15 cm from an upper surface of the drain 1 of the cuvert.

Reference numeral 4 designates a bed soil consisting of a lower drainage-layer 5 formed on the gravel-layer 3 and an upper growth-layer 6 formed on said lower drainage-layer 5.

And, said lower drainage-layer 5 is formed in a thickness of about 15 to 25 cm by spreading for example river sands all over the gravel-layer 3 and pressing them by means of a roller and the like. The lower drainage-layer 5 may be formed of river sands, to which a decomposed granite soil, which is one kind of soils of the spot, containing clay at a ratio of about 20% is added at a ratio of 20 to 30% by volume in place of merely the river sands.

In addition, said upper growth-layer 6 is formed in a thickness of about 5 to 15 cm by spreading a mixture comprising the decomposed granite soil containing clay at a ratio of about 20%, river sands, the artificial soil as shown in said Table 1 as the example and chemical fertilizers such as fused magnesium phosphate, calcium silicate and composite synthetic fertilizers (fertilizers mainly comprising nitrogen, phosphoric acid and potassium) and then pressing it by means of a roller and the like.

Table 2 shows one example of a mixture ratio (by volume) of the materials forming said upper growth-layer 6.

TABLE 2

| Material | Mixture ratio (%) |
|---|---|
| River sand | 65 |
| Decomposed granite soil | 20 to 26 |
| Artificial soil | 7 to 13 |
| Chemical fertilizer | 2 |

The followings are the reasons why a thickness of said upper growth-layer 6 is selected within a range of 5 to 15 cm. If the thickness of the upper growth-layer 6 is 5 cm or less, the upper growth-layer is wanting in water-holding property and fertilizer-holding property while if said thickness is 15 cm or more, the upper growth-layer 6 is deteriorated in drainage-property. And, said thickness can be suitably set according to the conditions. For example, it is set at 15 cm in a comparatively easily drying place while it is set at 5 cm in a shady and wet place. Besides, it is a reason why river sands are used as the sands that sands containing salts, such as sea sands, are harmful to the growth of a lawn.

Reference numeral 7 designates lawn grasses formed on said upper growth-layer 6 by seeding or sticking.

What is claimed is:

1. An artificial soil formed of a mixture comprising 2.5 parts by volume shirasu, 2.25 parts by volume peat or rotted bark compost, 0.25 parts by volume shellfish fossil, 0.25 parts by volume coral fossil, and 0.1 parts by volume of a mixture of polyethylene oxide and vermiculite.

2. A construction of a bed soil employing an artificial soil, which comprises:
   a. About 5 to 15 cm. of an upper growth layer formed of a mixture comprising
      i. an artificial soil formed of a mixture comprising 2.5 parts by volume shirasu, 2.25 parts by volume peat or rotted bark compost, 0.25 parts by volume shellfish fossil, 0.25 parts by volume coral fossil, and 0.1 parts by volume of a mixture of polyethylene oxide and vermiculite.
      ii. sand and
      iii. soil
   b. A lower drainage layer mainly comprising sand.

* * * * *